(No Model.)
C. E. BALDNER.
HEMP SPINNING MACHINE.
No. 501,475. Patented July 11, 1893.
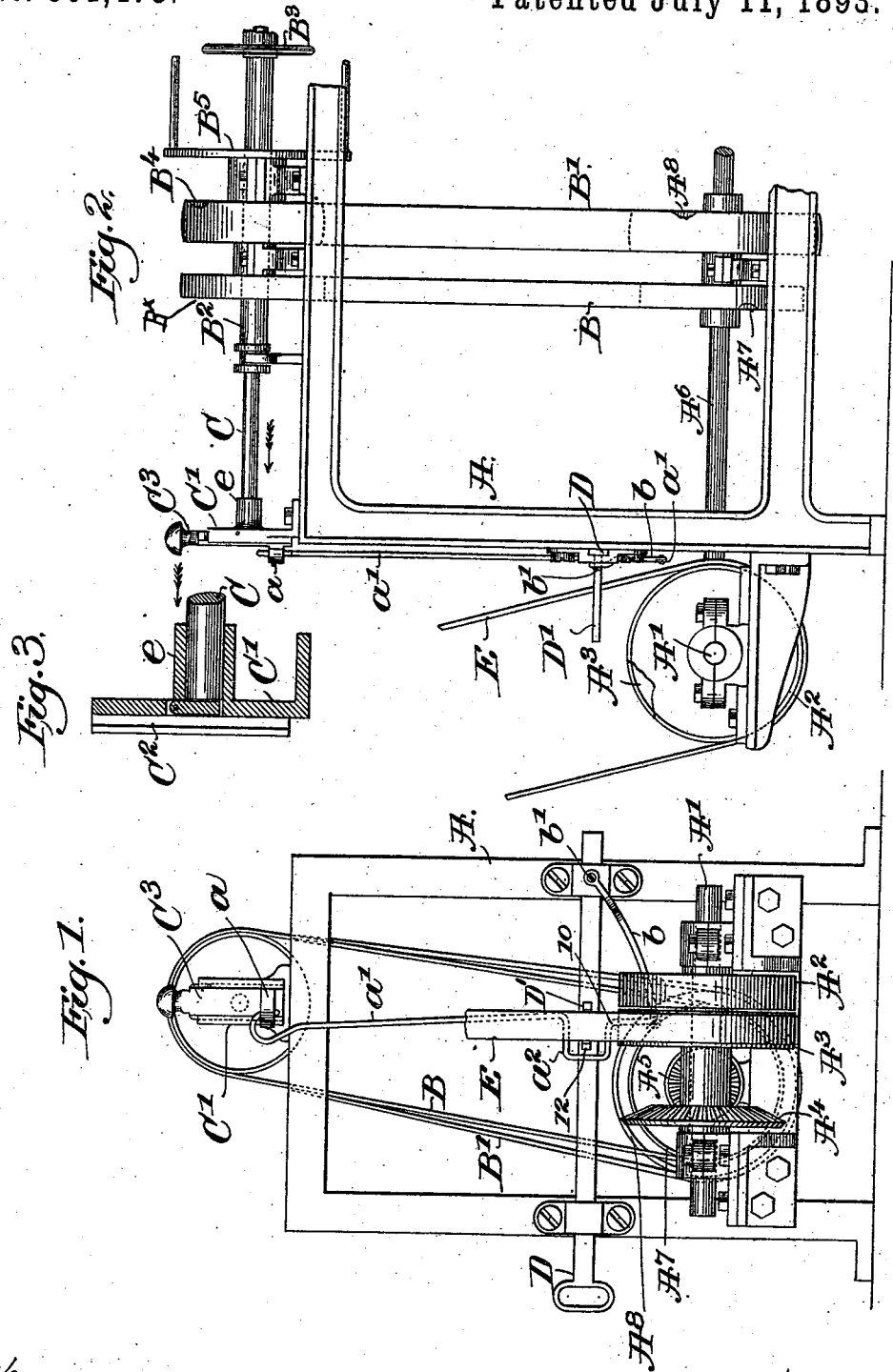
Witnesses:
Edward F. Allen
Louis N. Gowell
Inventor:
Charles E. Baldner
by Crosby & Gregory
Attorneys

UNITED STATES PATENT OFFICE.

CHARLES E. BALDNER, OF BOSTON, MASSACHUSETTS, ASSIGNOR OF ONE-HALF TO WHIPPLE N. POTTER, JR., OF SAME PLACE.

HEMP-SPINNING MACHINE.

SPECIFICATION forming part of Letters Patent No. 501,475, dated July 11, 1893.

Application filed March 22, 1893. Serial No. 467,187. (No model.)

*To all whom it may concern:*

Be it known that I, CHARLES E. BALDNER, of Boston, county of Suffolk, State of Massachusetts, have invented an Improvement in Hemp-Spinning Machines, of which the following description, in connection with the accompanying drawings, is a specification, like letters and figures on the drawings representing like parts.

This invention has for its object to improve the class of machines wherein hemp is straightened and spun and wound on a spool within a rapidly rotating flier. In this class of machines a sliding centering spindle is used to center the spool with relation to the flier, and when a full spool is to be removed and an empty spool is to be put into the flier, this spindle has to be withdrawn. This spindle is supported at its outer end in a bearing made as part of a stand having a guide-way in which is placed and guided a movable abutment, the latter when in its normal position forming an arresting device for the outer end of the spindle, so that the spindle cannot accidentally escape from its normal working position. When, however, it is desired to remove a spool, the operator stops the machine by or through the belt shipper, lifts the abutment, uncovers the bearing in which the spindle rests, and then draws the spindle longitudinally until its inner end is sufficiently withdrawn from the spool to enable the latter to be removed from the flier. When an empty spool has been replaced, the operator returns the spindle into its operative position, and then before again starting the machine, should drop the abutment and thereby confine the spindle in place, but in practice, the operator frequently neglects to do this, and the spindle works back and the spool flies out, to the great damage of the machine. I have aimed to so improve this class of machine that the operator has to stop the machine before the spindle can be withdrawn, and so that the machine cannot be again started until the spindle is in its normal position. And I have also carried my invention so far that the operator cannot lift the abutment until the machine has been stopped.

In my invention the parts are strong and durable, and in no way wear the belt.

Figure 1 is a rear end elevation of a hemp spinning machine with my improvements added to enable my invention to be understood. Fig. 2 is a right hand side view of the machine shown in Fig. 1, said view showing part of the usual dead spindle, flier, and spool, and Fig. 3 is a detail to be referred to.

The frame-work A, the power shaft $A'$ having a loose pulley $A^2$ and a fast pulley $A^3$, and a bevel gear $A^4$ to engage a bevel gear $A^5$ on the shaft $A^6$, the pulleys $A^7$ and $A^8$ on the said shaft, the belts B and $B'$ driven thereby, the belt B driving a pulley $B^x$ fast on the sleeve $B^2$ instrumental in rotating the spool $B^3$, while the belt $B'$ is extended over the pulley $B^4$ on the sleeve instrumental in rotating the flier $B^5$, the spindle C, the bearing stand $C'$ therefor, and the belt shipper D having suitable belt fork $D'$, are and may be all as common in usual machines for spinning hemp.

It will be understood, in accordance with the foregoing description, that the abutment $C^3$ normally occupies a position in the guide-ways $C^2$ of the stand $C'$, as represented in Figs. 1 and 2, and in said position the abutment prevents the outward or longitudinal movement of the spindle in the direction of the arrow.

I will now describe my invention:—To a lug or ear $a$ of the abutment referred to is secured the upper end of a rod $a'$, which, at its lower end, is jointed to a radius bar $b$ pivoted at $b'$ on a stationary part of the frame-work. The vertical rod $a'$ is off-set at $a^2$ to form a sort of loop into which, when the abutment and rod $a'$ are in their normal position to lock the spindle in place, the fork $D'$ of the belt shipper, it embracing the driving belt E, may rest and keep the said driving belt upon the fast pulley. Now this is the normal position of the machine when running, and during this position the operator cannot lift the abutment to withdraw the spindle, but the spool having been sufficiently filled the operator must, before the spindle can be withdrawn from the spool to take it out of the flier, move the shipper in the direction to place the belt upon the loose pulley. As soon as the fork D' of the belt shipper has arrived in position to put the belt upon the loose pulley, then, and only then, the rod a' is free to be lifted sufficiently, by or through the upward movement of the abutment, to uncover the hole in the bearing e of the stand C', and in such position of the abutment the spindle may be pulled out in the direction of the arrow. The full spool having been removed and a new one put into its place, the operator will move the spindle in a direction opposite the arrow so as to enter and hold the spool, and the operator should lower the abutment before starting the machine.

In accordance with my invention when the abutment is elevated as described to let the spindle be pulled out, the portion 10 of the rod a' rests against the arm 12 of the belt fork, and it will be seen that the operator cannot start the machine until after the abutment has been lowered, and the abutment cannot be lowered until after the spindle has been put back into its normal position. It results therefore in accordance with my improved parts that the operator to start the machine, an empty bobbin having been put into the flier, must push the spindle into its normal position and must then lower the abutment, the lowering of the abutment to hold the spindle in place releasing the belt shipper from the position in which it compels the driving belt to remain on the loose pulley, and only after this has been done can the operator move the belt shipper and bring it back into its normal position, shown in Fig. 1.

The rod a' in its operation does not wear upon the belt or upon the belt shipper, and is a very durable and lasting device, and by its use it is impossible for the operator, by carelessness, to let the spindle C get out of place during the operation of the machine or when getting ready to operate the machine.

The function and purpose of the radius bar b is as a guide for the lower end of the rod a', and instead of the said radius bar I may employ any other suitable guide to, in a measure, direct and control the lower end of the rod a'.

I have herein used the term "fast-pulley" and "loose-pulley," and I intend by such terms to cover not only a regular belt pulley, such as shown, but any other usual equivalent power pulleys co-operating in pairs.

Having described my invention, what I claim as new, and desire to secure by Letters Patent, is—

In a spinning machine the combination with a longitudinally movable spindle, its bearings, an abutment to close the spindle bearing and keep the spindle in its normal position, and a shipper, of a rod connected with said abutment, and a guide for the lower end of said rod, said rod being offset, as described, to form a loop, a portion of the said rod below the said loop serving to lock the shipper in position to retain the belt on the loose pulley, the loop serving to receive the belt shipper when the belt is on the fast pulley and to prevent the upward movement of the abutment until after the shipper has been moved to stop the machine, substantially as described.

In testimony whereof I have signed my name to this specification in the presence of two subscribing witnesses.

CHAS. E. BALDNER.

Witnesses:
GEO. W. GREGORY,
W. N. POTTER, Jr.